Figure 1:
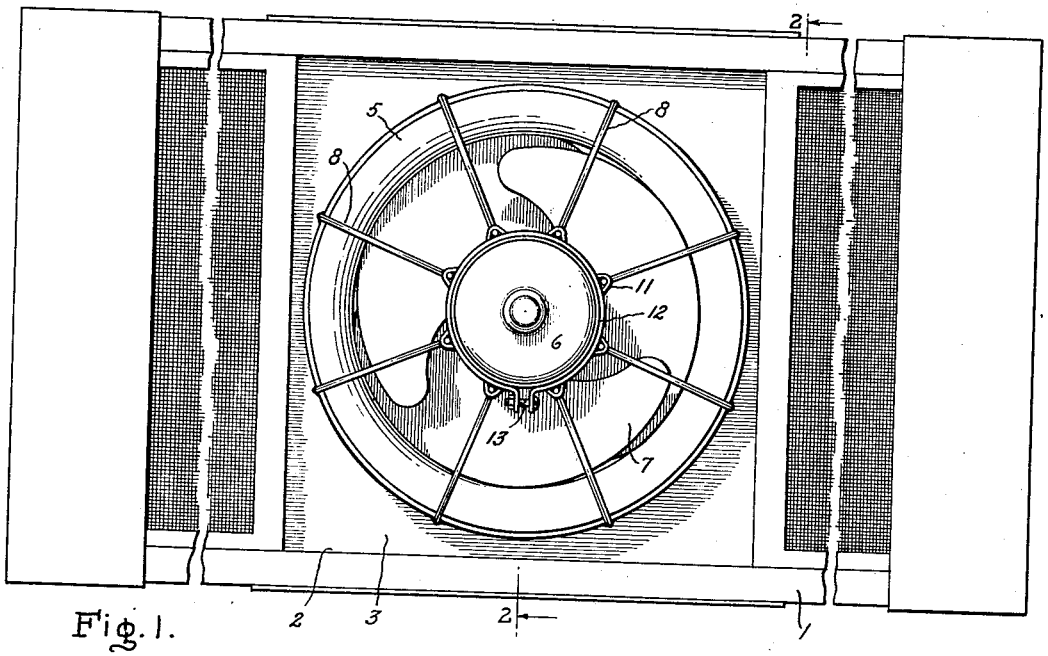

Oct. 19, 1937.  W. K. SKOLFIELD  2,096,621
MOUNTING FOR ELECTRIC MOTORS AND THE LIKE
Filed Oct. 3, 1933

Inventor
William K. Skolfield
by Harry E. Dunham
His Attorney.

Patented Oct. 19, 1937

2,096,621

UNITED STATES PATENT OFFICE 2,096,621

MOUNTING FOR ELECTRIC MOTORS AND THE LIKE

William K. Skolfield, Bridgeport, Conn., assignor to General Electric Company, a corporation of New York Application October 3, 1933, Serial No. 691,974

12 Claims. (Cl. 230—273)

In certain applications of electric motors and the like, quietness in operation is important. One source of noise is caused by vibration. Vibration may be of two kinds, vibration in a circumferential direction, which may be caused by torque pulsations, and vibration in a transverse direction, which may be caused by unbalance of the rotating parts. Such vibrations, if not absorbed, are transmitted to the motor mounting plate or bed plate and result in objectionable noise.

Another source of noise is caused by magnetic action of the motor. Such noise is due not only to the 120 cycle pulsation which occurs in a single phase motor on 60 cycles (this being an operating condition frequently met with), but may be due, also, to the number of stator and rotor slots used, their width, spacing, etc., or the eccentricity of the rotor in the stator, which may produce noise because of the air gap being greater on one side than on the other side of the rotor. The so-termed 120 cycle hum is more distinctly in the nature of vibration. The magnetic hum is of much higher frequency. Both are equally disturbing and objectionable if transmitted to the mounting plate or bed plate.

The object of my invention is to provide an improved supporting means for an electric motor or the like which is capable of absorbing both circumferential and transverse vibrations and which at the same time is simple in structure and capable of being manufactured at low cost.

For a consideration of what I believe to be novel and my invention, attention is directed to the accompanying description and the claims appended thereto.

One application of my invention, and an application for which it is especially well adapted, is in connection with electric fans, and in the drawing I have illustrated the invention in connection with an electric fan for a window ventilator. It is to be understood, however, that this is only by way of example, and that the invention may be used wherever found applicable.

Figure 2:
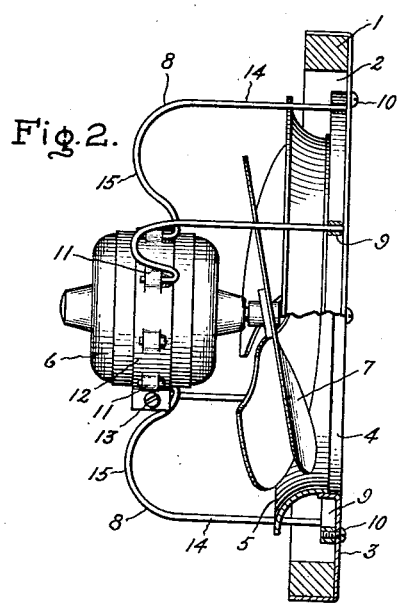

In the drawing, Fig. 1 is a rear view of a window ventilator comprising an electric motor driven fan supported by means embodying my invention, and Fig. 2 is a sectional view taken on line 2—2, Fig. 1.

Referring to the drawing, 1 indicates a window frame provided with a rectangular opening 2 over which is fastened a base plate or bed plate 3 which may be formed of suitable material such as sheet metal. Base plate or bed plate 3 is provided with a round opening 4 surrounded by a flanged wall 5 in front of which the fan is mounted. Base plate or bed plate 3 is to be taken as typical of any fixed support for an electric fan.

The electric fan comprises an electric motor 6 having a fan 7 mounted on its shaft. It is to be taken as typical of any electric motor driven device.

According to my invention, I support the motor-driven device, in the present instance the electric fan, by means of a plurality of circumferentially spaced spring supporting arms 8, each of which at one end, its inner end, is fixed to base plate or bed plate 3 in a suitable manner and at the other end, its outer end, is fixed to the motor casing in a suitable manner. In the present instance, the inner ends of arms 8 are welded to a ring 9 which in turn is fastened to base plate or bed plate 3 by screws 10. The outer ends of arms 8 are located in sockets 11 formed by struck-out portions of a band 12 which encircles the motor casing and is clamped thereto by a bolt 13. Preferably the ends are rigidly fixed in the sockets by welding. Band 12 surrounds the motor body at a point such that the motor and fan are supported at their center of mass.

Each arm 8 has a straight axially extending portion 14 which is relatively long compared to the total length of the arm and a curved or bowed portion 15 at its outer end where it is attached to the motor. The curved or bowed portions 15 of the arms serve to directly yieldingly support the weight of the motor and fan. The weight is carried through the curved portions and is then transferred to the base plate or bed plate 3 by the axially extending portions 14 of the arms. The arms 8 have sufficient flexibility to absorb vibrations in both transverse and circumferential directions. The bowed or curved portions 15 of the arms serve more particularly to absorb vibrations in a transverse direction and the axially extending portions 14 of the arms serve more particularly to absorb vibrations in a circumferential direction, i. e., torque vibrations. The bowed or curved portions to some extent absorb circumferential vibrations but not to a great extent and I consider the provision of the relatively long axially extending portions of the arms as being an important feature of my invention as I have found such portions to be especially effective in absorbing vibrations in a circumferential direction, thus preventing them from reaching the base plate or bed plate.

In connection with the construction, it will be noted that the weight of the motor and fan is supported by yielding means (i. e., the arms 8) spaced circumferentially around the motor and fan. As a result, the weight is distributed among the several arms so that no one is required to carry much weight or is stressed to any considerable extent. This enables the arms to be made quite resilient so that they are better able to absorb vibrations. Also, an important feature of the construction is the arrangement whereby the motor and fan are supported at their center of mass for by this arrangement vibration is free about the support as an axis.

As will be clear, a construction embodying my invention is simple in structure so that it may be manufactured at low cost, and it is easy to assemble and dismantle. In addition, in the case of an electric fan, that construction has the advantage that the supporting arms form guards for the fan which will prevent window curtains or the like being drawn into the fan by the air stream and tend to prevent a hand being put into the fan blades.

What I claim as new and desire to secure by Letters Patent of the United States, is:

1. In combination, an electric fan comprising a motor and fan blades, a base, and a plurality of circumferentially spaced arms having yieldable axial and radial portions which are fixed at one end to the base, extend over the fan blades, and are then curved inwardly toward said base plate and attached at their other ends to the motor, said arms supporting the fan on the base and forming a guard therefor and serving to absorb radial and circumferential vibrations.

2. In combination, an electric motor, a fan carried on the motor shaft, a base, a structure for resiliently supporting the motor on the base comprising a plurality of circumferentially spaced arms connected at one end to said base and at the other end to the motor, said arms having portions extending axially from said base of sufficient flexibility for absorbing vibrations in a circumferential direction, and the connections between the motor and said arms comprising means flexible in a radial direction and serving to absorb vibrations transverse to the axis of the motor.

3. In combination, an electric motor, a fan carried on the motor shaft, a base, a structure for resiliently supporting the motor on the base comprising a plurality of circumferentially spaced arms connected to said base, said arms having axially extending portions projecting outwardly from the base of sufficient flexibility for absorbing vibrations in a circumferential direction and having curved ends extending radially inward therefrom and attached to said motor, said curved ends being flexible in a radial direction and serving to absorb vibrations transverse to the axis of the motor.

4. In combination, an electric motor, a fan carried on the motor shaft, a base, a structure for resiliently supporting the motor on the base comprising a plurality of circumferentially spaced arms connected to said base, said arms having axially extending portions projecting outwardly from said base of sufficient flexibility for absorbing vibrations in a circumferential direction and having curved portions flexible in a radial direction which are attached to the motor at points surrounding the center of mass of the combined motor and fan, said curved portions absorbing vibrations transverse to the axis of the motor.

5. In combination, an electric motor, a fan carried on the motor shaft, a base, a structure for resiliently supporting the motor on the base comprising a plurality of circumferentially spaced arms connected to the base, said arms having axially extending portions projecting outwardly from the base of sufficient flexibility for absorbing vibrations in a circumferential direction and having curved portions at the ends thereof extending inwardly toward the base and attached to the motor, said curved portions being flexible in a radial direction and serving to absorb vibrations transverse to the axis of the motor.

6. In combination, an electric fan comprising a motor and fan blades, a base, and a guard for the fan blades comprising a plurality of circumferentially spaced arms having yieldable axial and radial portions which at one end are fixed to the base, extend over the fan blades, and are then curved radially inward and attached at their other ends to the motor, said arms supporting the fan on the base and serving to absorb radial and circumferential vibrations.

7. In combination, an electric motor, a fan carried on the motor shaft, a base, and a structure for resiliently supporting the motor on the base comprising a plurality of circumferentially spaced arms having yieldable axial and radial portions connected at one end to the motor and at the other end to the base, said arms extending from a point intermediate the ends in a direction more axial than radial toward one end and in a direction more radial than axial toward the other end and serving to absorb radial and circumferential vibrations.

8. In combination, an electric fan comprising a motor and fan blades, a base, and a plurality of circumferentially spaced yieldable arms which at one end are fixed to the base, extend axially over the fan blades, and are then curved inwardly toward said base plate and attached at their other ends to the motor, said arms supporting the fan on the base and forming a guard therefor and serving to absorb vibrations, the axially extending portions of said arms being sufficiently flexible to absorb vibrations in a circumferential direction and the curved portions of said arms being of sufficient flexibility to absorb vibrations in a radial direction.

9. In combination, an electric motor, a fan carried on the motor shaft, a base, and a plurality of circumferentially spaced curved arms for supporting the motor on the base and forming a guard for the fan, said arms having flexible axial and radial portions extending from the base over the fan and forming a guard therefor and being sufficiently flexible in a radial and a circumferential direction for absorbing vibrations in said directions.

10. In combination, an electric fan comprising a motor and fan blades, a base, and a guard for the fan blades comprising a plurality of circumferentially spaced yieldable arms which at one end are fixed to the base, extend axially over the fan blades, and are then curved radially inward and attached at their other ends to the motor, said arms supporting the fan on the base and serving to absorb vibrations, the axially extending portions of said arms being of sufficient flexibility to absorb vibrations in a circumferential direction and the curved portions of said arms being of sufficient flexibility to absorb vibrations in a radial direction.

11. In combination, an electric motor, a fan carried on the motor shaft, a base, and a structure for resiliently supporting the motor on the base comprising a plurality of circumferentially spaced arms connected at one end to the motor and at the other end to the base, said arms extending from a point intermediate the ends in a direction more axial than radial toward one end and in a direction more radial than axial toward the other end, the portions of said arms extending in a direction more axial than radial being of sufficient flexibility to absorb vibrations in a circumferential direction and the portion of said arms extending in a direction more radial than axial, being of sufficient flexibility to absorb vibrations in a radial direction.

12. In combination, an electric motor, a fan carried on the motor shaft, a base, and a plurality of circumferentially spaced curved arms having flexible radial and axial portions for supporting the motor on the base, said arms extending from the base over the fan and forming a guard therefor and being flexible in radial and circumferential directions for absorbing radial and circumferential vibrations.

WILLIAM K. SKOLFIELD.